Patented Nov. 18, 1952

2,618,594

UNITED STATES PATENT OFFICE 2,618,594

FOAM-PRODUCING COMPOSITION AND METHOD OF PREPARING SAME

Samuel I. Kalkstein, Bellmawr, N. J., assignor to MacAndrews and Forbes Company, Camden, N. J., a corporation of New Jersey No Drawing. Application December 2, 1948, Serial No. 63,203

6 Claims. (Cl. 252—8.05)

The present invention relates to an improved air-foam-producing composition and its preparation; and more particularly to a proteinaceous composition adapted for use as a foam-producing material which is resistant to bacterial action and maintains marked bactericidal properties over long periods of time.

The production of air-foam-producing compositions has been the aim of investigators for many years, and it has been found that concentrated liquid products resulting from the partial hydrolysis of proteinaceous material produce excellent fire-fighting foams when mixed with air aid water. The stability of foams produced from such materials is substantially improved by the presence of water-soluble salts of metals such as iron, aluminum, chromium, and copper. Other additives are generally incorporated in the composition for various reasons. For instance, since such compositions are often exposed to low temperatures for long periods of time, it is generally desirable to include a freezing point depressant. There are a wide variety of freezing point depressants, however, urea is one of the most economical, and its presence is desirable for other reasons such as to reduce the viscosity of the composition. When used in fire-fighting apparatus, a foam-producing composition must stand for long periods of time under varying temperature conditions. Nevertheless, it must be ready at any time for use in the foam-producing apparatus in case of emergency. When called into use, it must possess its foam-producing properties, must be substantially free of sediment which would cause clogging of the apparatus, and must possess proper flowing characteristics.

Such compositions as above-described, however, although they possess excellent foam-producing properties when freshly made, are attended by various disadvantages which are for the most part traceable to the fact that the partially hydrolyzed proteinaceous material, which forms the base, provides an excellent medium for the growth of bacteria and/or fungi. Obviously, putrefaction of such foam-producing material to the extent of producing offensive odors and unsightly mold growth cannot be tolerated. However, the problem is much more serious than the mere prevention of disagreeable odors and mold growth. While bacteria counts of several million may be required to produce disagreeable odors, the metabolism of even a relatively small amount of bacteria may cause serious chemical changes to take place in the composition resulting in its ultimate destruction. For example, the lowering of the pH caused by the by-products of the bacterial metabolism leads to iso-electric precipitation of the pH-sensitive proteinaceous material.

This phenomenon is greatly aggravated by the presence of urea in the composition. *Proteus vulgaris*, as its name implies, is one of the most common bacteria, and is the bacteria most likely to contaminate proteinaceous foam-producing compositions of the type described. Of all the millions of bacteria, *proteus vulgaris* is one of the few which produces urease as a major metabolism product. Urease is the enzyme which specifically causes the decomposition of urea, which decomposition in turn leads to the complete destruction of the foam-producing composition as a whole due to precipitation of metal carbonates and eventual iso-electric precipitation of the proteinaceous material.

There is an additional problem encountered with such foam-producing compositions which arises from the fact that the foam-stabilizing metal salt, most generally an iron salt, tends to precipitate ferric hydrate in the presence of air. The precipitation of the hydrate not only produces a sediment in the composition which clogs the draft tubes of the foam-producing nozzles, but also removes the stabilizing metal from solution whereby its stabilizing effect is lost.

From the foregoing, it will be seen that the maintenance of the foam-producing composition substantially or entirely free of bacteria growth over long periods of time is of the utmost importance. Various bacteriacides, fungicides, and other types of preservatives, such as borates, boric acid, organic mercurial compounds, quaternary nitrogen compounds, water-soluble salts of chlorinated phenols, benzoates, fluosilicates, and the like have been suggested for use in proteinaceous foam-producing compositions with the view of preventing the growth of bacteria. The use of any of these common preservatives gives rise to such disadvantages as to limit or prevent its application. In some cases, the use of an amount of the preservative necessary to provide satisfactory protection causes either a marked decrease in the volume of foam or complete destruction of the foam produced. In other cases, the preservative is only temporarily compatible with the composition, and in time its effectiveness is lost. In still other cases, the preservative is chemically reactive with components of the composition, forming precipitates or otherwise rendering it ineffective in the composition. None of these, in addition, has provided a composition which is indefinitely resistant to the growth of bacteria, or which remains free of bacteria over long periods of time and under varying storage conditions.

Inasmuch as a fire fighting composition is only used in emergencies, any condition which would lessen its performance must be avoided. It will thus be seen that the problems encountered with partially-hydrolyzed proteinaceous foam-producing compositions are specific and are not comparable to those encountered in other fields, where the requirements imposed on the compositions are not as severe.

It is, therefore, a principal object of the present invention to provide a foam-producing composition of the partially-hydrolyzed proteinaceous-material type, with which the above-mentioned difficulties are not encountered.

A further object is to provide a foam-producing composition of the partially-hydrolyzed, proteinaceous-material type which is indefinitely resistant to bacterial and mold growth, and which remains substantially free of bacteria over extended periods of time and under varying storage conditions.

A further object is to provide a proteinaceous foam-producing composition in which urea may be incorporated without danger of destroying the composition through enzymatic decomposition of the urea.

Still another object is to provide a proteinaceous foam-producing composition containing a foam-stabilizing metal salt, in which composition there is little or no tendency for the metal salt to be converted to sediment-forming precipitates.

Other objects, including a novel process of preserving partially-hydrolyzed proteinaceous foam-producing compositions, will be apparent from a consideration of the following specification and the claims.

The foam-producing composition of the present invention comprises a solution of partially-hydrolyzed proteinaceous material in which is dissolved a solution of unsymmetrical (2, 4, 5) trichlorophenol in a water-soluble organic solvent to provide a concentration of the 2, 4, 5 trichlorophenol in excess of that which would ordinarily be soluble in the foam-producing composition.

It has been found that 2, 4, 5 trichlorophenol possesses remarkable bactericidal and fungicidal properties in partially-hydrolyzed proteinaceous-material compositions when incorporated therein in the manner described. In fact compositions prepared in accordance with the present invention have been standing for over fourteen months, some at incubation temperatures (37° C.) and some at room temperature (about 25° C.), and have maintained a bacteria count of zero and a yeast and mold count of zero. In other words, after over fourteen months of standing under the conditions mentioned, the foam-producing composition is still entirely free of bacteria and fungi. A comparison of these results with those obtained by the use of other preservatives indicates an unexpected bactericidal and fungicidal activity of 2, 4, 5 trichlorophenol on partially-hydrolyzed proteinaceous foam-producing compositions. As a consequence of this, there is no danger of the destruction of the foam-producing composition through activity of bacteria or fungi while standing even in high tropical temperatures. Moreover, decomposition of urea by urease is eliminated, permitting the use of urea as the inexpensive freezing-point depressant and viscosity reducer. A further advantageous feature of the presence of 2, 4, 5 trichlorophenol in foam-producing compositions of the type described is the fact that it reduces the tendency for the foam-stabilizing metal salt to separate from the composition during standing and before conversion of the composition into foam. While the exact reason for this is not fully understood, it is believed that the 2, 4, 5 trichlorophenol, being in the free phenol form, forms a chelate type compound with the metal, holding it in solution in the body of the composition.

Referring further to the partially-hydrolyzed proteinaceous material employed as the foam-producing base in the composition of the present invention, it may be any of those proteinaceous materials employed in the preparation of foam-producing compositions. Numerous proteinaceous materials have been used or suggested for use in the preparation of air-foam compositions, such as those found in horns, hoofs, hair, blood, fish meal, distillery waste, soya bean meal, pea flour, corn meal, and the like. In the preparation of foam-producing compositions from such proteinaceous materials, they are subjected to a controlled hydrolyzation treatment whereby the nitrogen present in the water-soluble products is in the form of degradation products of the original protein base material. There is a wide variety of methods available for the preparation of partially-hydrolyzed proteinaceous materials adapted for use as foam-producing bases which are well known in the art, and it will be appreciated that the present invention is applicable to any such foam-producing compositions prepared by partially hydrolyzing proteinaceous materials. The hydrolysis treatment generally consists in heating the proteinaceous material in an aqueous medium and in the presence of a hydrolyzing agent, either base, acid, or enzyme, until the desired degree of hydrolysis or degradation has been attained. The hydrolyzing agent most generally employed, however, is a cheap basic material such as lime, although other alkaline earth hydroxides such as barium hydroxide and strontium hydroxide may be used if desired.

After the partial hydrolysis of the protein has been obtained, the product is generally adjusted to a pH within the substantially neutral range, such as between about 6.5 and about 8. In the event a basic alkaline earth metal hydrolyzing agent is employed, an acidic material is added to adjust the pH as described. Although free acid may be used for this purpose, a highly advantageous method of adjusting the pH of the partially hydrolyzed protein product is by the use of a water-soluble material which furnishes ammonium ions and which furnishes anions capable of forming a substantially water-insoluble salt with the alkaline earth cations, as disclosed and claimed in the copending application of Clement K. Swift, Serial Number 29,925, filed May 28, 1948, now Patent No. 2,515,276. Various additives which are normally incorporated in foam-producing compositions of the type described, such as the iron salt, may be relied upon to reduce the pH somewhat.

It is normally desirable that the partially-hydrolyzed proteinaceous composition be of relatively high solids content for storage in the fire-fighting apparatus (and for storage purposes in general) so that when called into use it is necessary to mix water and air therewith during its conversion into foam. Generally, the amount of partially-hydrolyzed proteinaceous material present in the liquid composition does not exceed about 45% of the composition by weight. While, for the purposes of generating foam the amount of partially hydrolyzed proteinaceous material may be as low as a few per cent, for the purposes of storage in the fire-fighting apparatus (and storage in general), it generally is present in an amount not less than about 15% by weight of the composition. Preferably, the amount of partially-hydrolyzed proteinaceous material in the composition is between about 18% and about 28% by weight. To provide these concentrations, the solution of partially-hydrolyzed material, after adjustment of pH if necessary, is concentrated, although some or all of any concentration required may take place during the hydrolysis step. The remainder of the composition, of course, will comprise the liquid carrier, usually water, in which the partially-hydrolyzed proteinaceous material is dissolved, plus the 2, 4, 5 trichlorophenol with its water-soluble solvent and other additives of the type hereinafter described.

As stated, in the composition of the present invention, there is present in solution 2, 4, 5 trichlorophenol. 2, 4, 5 trichlorophenol is a solid possessing very limited solubility in water, its solubility having been reported as only about 0.1% at 25° C. in pure water. However, with foam-producing compositions of the type described, no significant amount of 2, 4, 5 trichlorophenol can be practically dissolved directly therein. Nevertheless, it has been found that in order to provide the requisite bactericidal and fungicidal properties as described herein it is necessary to incorporate the 2, 4, 5 trichlorophenol in the composition in an amount in excess of that which is normally soluble therein. Thus the 2, 4, 5 trichlorophenol is present in the composition of the invention in an amount of at least about 0.05%, based on the weight of the composition. While the upper limit, so far as bactericidal properties are concerned, is not critical, the 2, 4, 5 trichlorophenol is generally not present in an amount in excess of about 3.0%. Preferably, the 2, 4, 5 trichlorophenol is present in the composition in an amount between about 0.15% and about 0.5% based on the weight of the composition. In accordance with the present invention, therefore, an intimate dispersion of the required amount of 2, 4, 5 trichlorophenol in the composition is obtained by first dissolving the 2, 4, 5 trichlorophenol in a water-soluble solvent therefor, and then dissolving the resulting solution in the foam-producing composition.

Examples of such water-soluble solvents for 2, 4, 5 trichlorophenol applicable for use are the glycol ethers, such as the monomethyl ether of ethylene glycol, the monoethyl ether of ethylene glycol, the monomethyl ether of propylene glycol, the monoethyl ether of propylene glycol, and the like; the glycols such as ethylene glycol, propylene glycol, the diethylene glycols, triethylene glycols, and other polyglycols; glycerin; alcohols, such as methyl alcohol, ethyl alcohol and propyl alcohol; urea-water mixtures; and the like. Mixtures of solvents may be used, if desired. Of the solvents available, the use of the ethyl ether of ethylene glycol as at least a portion of the solvent is preferred. The 2, 4, 5 trichlorophenol is instantly soluble therein to form a clear red-colored solution indicating a possible chemical combination between the phenol and the glycol ether.

The amount of solvent employed may vary widely and will be at least sufficient to dissolve the required amount of 2, 4, 5 trichlorophenol. For this purpose, the exact amount of solvent required will depend upon which solvent is selected, for instance the solubility of 2, 4, 5 trichlorophenol in methyl alcohol is about 6 parts per part of solvent while its solubility in ethyl alcohol is about 5 parts per part of solvent. It will be noted, however, that the solvents mentioned are all materials possessing freezing point-lowering properties, that is, when mixed with an aqueous system they lower the freezing point of the system. As indicated previously, it is often desirable to incorporate a freezing-point depressant in foam-producing compositions to lower the temperature at which the composition solidifies, and thus in the product of the present invention the solvent for the 2, 4, 5 trichlorophenol also advantageously functions to some extent at least as a freezing point depressant. For such purposes, the amount of solvent may vary widely, and although for general applications it generally will not exceed about 15% of the composition, in applications where the composition will be subjected to extremely low temperatures the amount of freezing point depressant may reach as high as about 60% of the composition, thus in effect replacing a relatively large portion of the water as the carrier.

As is well known, there is normally present in proteinaceous foam-producing compositions a soluble metal salt foam-stabilizing agent. Water-soluble salts of such metals as iron, aluminum, chromium, and copper are suitable foam-stabilizing agents. Ferrous sulphate is generally the metal salt most often employed for this purpose. The amount of water-soluble metal salt foam-stabilizer employed will generally be between about 1.0% and about 5.0% of the foam-producing composition.

In preparing the bacteria- and fungus-resistant foam-producing composition of the present invention, the order of addition of materials to the partially-hydrolyzed proteinaceous base is immaterial so long as a uniform blend is obtained. The preparation of the product except for the addition of the solution of 2, 4, 5 trichlorophenol will present no problem to those familiar with the art and follows well known procedures. As indicated, the 2, 4, 5 trichlorophenol, because of its limited solubility in the solution of partially-hydrolyzed proteinaceous material, is dissolved in a water-soluble solvent therefor of the type hereinabove described, and the resulting solution is mixed with and dissolved in the foam-producing composition.

The following tables illustrate the remarkable resistance to the growth of bacteria as well as the bactericidal properties of the foam-producing composition of the present invention as compared with foam-producing compositions containing various well-known preservatives. In Table I, the growth of bacteria is measured, if possible, in samples of foam-producing compositions containing various preservatives and these are compared with the results obtained by following the teachings of the present invention. In all cases, bacteria counts are given in number of viable bacteria per cc. of sample. Certain of the samples were maintained at about 25° C. over the testing period, while others were maintained under incubation conditions at 37° C.

trasted to the "soluble" chlorinated phenol materials such as the sodium chlorophenates, which, as illustrated in Table II, tend to reseparate from the composition by the formation of complex precipitates.

TABLE I

| Preservative | Conc. | Temp. | Bacteria count [1] | | | | |
|---|---|---|---|---|---|---|---|
| | | | 1 mo. | 2 mos. | 3 mos. | 4 mos. | 13 mos. |
| | *Percent* | ° C. | | | | | |
| 1. Sodium fluosilicate | 1 | 25 | After 1 month, the material had putrefied so badly no further bacteria counts were made. | | | | |
| 2. Lauryl isoquinolinium bromide | .1 | 25 | After 2 months, the material had putrefied so badly no further bacteria counts were made. Although higher concentrations may be more effective, they destroy the foam produced by the composition. | | | | |
| 3. Pyridyl mercuric acetate | .05 | 25 | (2) | (2) | 1,275,000 | | |
| 4. Boric acid | .75 | 37 | 2,254,000 | | | | |
| 5. Composition of present invention containing 0.2% 2,4,5 trichlorophenol dissolved in 5% by weight of the monoethyl ether of ethylene glycol. | .2 | 25 | 0 | 0 | 0 | 0 | 0 |
| | | 37 | 0 | 0 | 0 | 0 | 0 |
| 6. Composition of present invention containing 0.2% of 2,4,5 trichlorophenol dissolved in 0.4% by weight of the monoethyl ether of ethylene glycol. The composition also contained about 2% of urea. | .2 | 25 | 0 | 0 | 0 | 0 | 0 |
| | | 37 | 0 | 0 | 0 | 0 | 0 |

[1] Yeast and mold counts indicate that the growth of yeast and mold goes along with bacterial growth and only in the case where zero bacteria counts were maintained as in 5 and 6 were zero yeast and mold counts also maintained.
[2] Less than 100.

Table II illustrates the marked bactericidal effect of the composition of the present invention, i. e., the ability to destroy bacteria added to it, as well as its resistance to bacteria growth. The data set forth in Table II are obtained by inoculating foam-producing compositions containing various preservatives with putrefied proteinaceous foam-producing compositions and measuring the decrease, if any, in bacteria count within a few days. To be satisfactory for the applications for which the foam-producing compositions are intended, the sample should exhibit a bacteria count of substantially zero within a few days, and this low bacteria count should be maintained over long periods of time.

TABLE II

| Preservative | Conc. | Temp. | Bacteria count |
|---|---|---|---|
| | *Percent* | ° C. | |
| 1. Sodium fluoride. | 0.1 | 25 | 304,000 at 3 days; 196,000 at 6 days. |
| 2. Sodium Borate. | .2 | 25 | 280,000 at 3 days. |
| 3. 8-hydroxyquinoline sulfate. | .1 | 25 | 1100 at 1 day, 400 at 3 days; however, this preservative precipitated within a few days, thereby becoming ineffective. |
| 4. Sodium salt of pentachlorophenol. | .2 | 37 | 100 at 5 days; 100 at 19 days; 10,000 at 37 days; 1,000,000 at 83 days. At the end of about 2 months, there was evidence that this preservative precipitated from the composition, thereby becoming ineffective. |
| 5. Composition of invention containing 0.2% of 2,4,5 trichlorophenol dissolved in 8.5% by weight of ethylene glycol. | .2 | 37 | 1000 at 0 days; 0 at 4 days; 0 at 15 days; re-inoculated; 0 at 30 days; 0 at 50 days. |

The foregoing tables illustrate the unusual resistance to bacterial growth and the bactericidal properties exhibited by the foam-producing composition of the present invention. As a direct result of these properties, the composition is chemically stable over long periods of time. The particular bactericide employed, 2,4,5 trichlorophenol, although it is of very limited water-solubility, is completely and permanently compatible in the composition when incorporated therein in the manner here disclosed. This is to be contrasted to the "soluble" chlorinated phenol materials such as the sodium chlorophenates, which, as illustrated in Table II, tend to reseparate from the composition by the formation of complex precipitates.

The following specific examples are to illustrate the product of the present invention and its preparation, and are not intended to limit the scope thereof in any way.

*Example 1*

A partially-hydrolyzed proteinaceous foam-producing base is prepared as follows: A suspension of 300 lbs. of starch-free corn gluten, for example, the product known as "Corn Products Corn Protein No. 3320," and 30 lbs. of quicklime is made in 180 gallons of cold water. This mixture is heated to boiling in a steam-jacketed kettle provided with a suitable agitating device, and is maintained at the boiling point for five hours. The product is filtered and adjusted to a pH of about 8 with sulphuric acid. The solution is then concentrated to a specific gravity of 1.13, and to the hot concentrate is added a solution of 10 lbs. of ferrous sulphate in 3 gallons of hot water, reducing the pH of the composition to about 7.

In a separate vessel, 0.2 lbs. of 2,4,5 trichlorophenol are mixed with 5 lbs. of monoethyl ether of ethylene glycol. The phenol dissolves readily, forming a clear reddish solution. This solution is then added with mixing to 100 lbs. of the partially hydrolyzed protein concentrate prepared as described above. A sample of the resulting mixture has been stored for fourteen months under incubation conditions at 37° C. and has maintained a bacteria count and a mold count of zero over this time. Another sample has been stored at 25° C. for fourteen months and has also maintained a bacteria count and a mold count of zero.

*Example 2*

To 100 lbs. of the partially-hydrolyzed protein concentrate, prepared as described in Example 1, is added to a solution prepared by mixing 0.2 lbs. of 2,4,5 trichlorophenol with 8.5 lbs. of ethylene glycol. The resulting mixture was stored for fourteen months and maintained a bacteria count of zero throughout that period.

*Example 3*

To 100 lbs. of the partially-hydrolyzed protein concentrate, prepared as described in Example 1, is added with mixing a solution prepared by mixing 0.2 lbs. of 2,4,5 trichlorophenol with a urea-water mixture containing 5 lbs. of urea dissolved in 5 lbs. of water. The resulting mixture was stored for two months with no signs of deterioration or precipitation.

Example 4

The same procedure as in Example 3 was followed except that 0.2 lbs. of 2, 4, 5 trichlorophenol was dissolved in a mixture containing 10 lbs. of urea and 10 lbs. of water. After 2 months the foam-producing composition showed no signs of deterioration.

Example 5

To 100 lbs. of the partially-hydrolyzed protein concentrate, prepared as described in Example 1, is added with mixing a solution prepared by dissolving 2, 4, 5 trihclorophenol in a solution of 2.5 lbs. urea, 5 lbs. of ethylene glycol, and 2.5 lbs. of water. One sample of the resulting mixture has been stored for about nine months at 37° C., and another sample for the same period at 25° C. Bacteria counts of zero have been maintained in these samples over the period.

Considerable modification is possible in the selection of proteinaceous material, solvent, and the like, as well as in the technique of preparing the product of the invention without departing from the scope of the invention in any way.

I claim:

1. An air-foam-producing composition resistant to the growth of bacteria therein comprising an aqueous solution of partially hydrolyzed proteinaceous material containing between about 1% and about 5% of a water-soluble iron salt and having dissolved therein a solution of 2, 4, 5 trichlorophenol in a water soluble organic solvent therefor, said proteinaceous material being present in an amount between about 15% and about 45% by weight, and said 2, 4, 5 trichlorophenol being present in an amount between about 0.05% and about 3% by weight, based on the weight of the composition.

2. The product of claim 1 wherein the solvent for the 2, 4, 5 trichlorophenol is the monoethyl ether of ethylene glycol.

3. The product of claim 1 wherein the 2, 4, 5 trichlorophenol is present in an amount between about 0.15% and about 0.5% based on the weight of the composition.

4. An air-foam-producing composition resistant to the growth of bacteria therein comprising an aqueous solution of partially hydrolyzed proteinaceous material containing between about 1% and about 5% of a water-soluble iron salt and urea in an amount not greater than about 15%, and having dissolved therein a solution of 2, 4, 5 trichlorophenol in a water-soluble organic solvent therefor, said proteinaceous material being present in an amount between about 15% and about 45% by weight, and said 2, 4, 5 trichlorophenol being present in an amount between about 0.05% and about 3% by weight, based on the weight of the composition.

5. The product of claim 4 wherein the solvent for the 2, 4, 5 trichlorophenol is the monoethyl ether of ethylene glycol.

6. The product of claim 4 wherein the 2, 4, 5 trichlorophenol is present in an amount between about 0.15% and about 0.5% based on the weight of the composition.

SAMUEL I. KALKSTEIN.

REFERENCES CITED

The following references are of record in the file of this patent:

UNITED STATES PATENTS

| Number | Name | Date |
| --- | --- | --- |
| 1,946,057 | Britton et al. | Feb. 6, 1934 |
| 2,151,398 | Weissenborn | Mar. 21, 1939 |
| 2,212,470 | Friedrich | Aug. 20, 1940 |
| 2,324,951 | Ratzer | July 20, 1943 |
| 2,361,057 | Ratzer | Oct. 24, 1944 |
| 2,413,667 | Urquhart | Dec. 31, 1946 |
| 2,515,276 | Swift | July 18, 1950 |

OTHER REFERENCES

Gregory: "Uses and Applications of Chemicals and Related Materials," Reinhold Pub. Corp., N. Y. C. (1939) vol. I, pages 629, 630.